United States Patent
Muench et al.

(10) Patent No.: US 10,071,537 B2
(45) Date of Patent: Sep. 11, 2018

(54) CERAMIC MATRIX COMPOSITE COMPONENT AND METHOD OF FORMING THEREOF

(71) Applicant: THE BOEING COMPANY, Seal Beach, CA (US)

(72) Inventors: Brian Lee Muench, Huntington Beach, CA (US); Morris Dahmen, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 72 days.

(21) Appl. No.: 14/099,225

(22) Filed: Dec. 6, 2013

(65) Prior Publication Data

US 2015/0158272 A1 Jun. 11, 2015

(51) Int. Cl.
*C03B 29/00* (2006.01)
*B29C 65/00* (2006.01)
(Continued)

(52) U.S. Cl.
CPC .................. *B32B 5/32* (2013.01); *B32B 3/30* (2013.01); *B32B 7/12* (2013.01); *B32B 18/00* (2013.01); *B32B 37/1284* (2013.01); *C04B 35/488* (2013.01); *C04B 37/008* (2013.01); *C04B 38/008* (2013.01); *F01D 11/24* (2013.01); *F23R 3/007* (2013.01); *F28F 3/12* (2013.01); *B32B 2250/02* (2013.01); *B32B 2250/22* (2013.01);
(Continued)

(58) Field of Classification Search
CPC .. B32B 5/32; B32B 18/00; B32B 3/30; B32B 7/12; B32B 7/045; B32B 2266/04; C04B 2237/62; C04B 2237/64; C04B 2237/592; C04B 2237/61; C04B 2237/72; C04B 35/008; C04B 35/488
See application file for complete search history.

(56) References Cited

U.S. PATENT DOCUMENTS 3,794,707 A * 2/1974 O'Neill .................. B21B 39/20
156/89.27
4,130,160 A * 12/1978 Dziedzic ................ F28F 21/04
165/166
(Continued)

FOREIGN PATENT DOCUMENTS

DE 102008019556 A1 * 10/2009 .......... B01J 19/0093
DE 202010015615 U 3/2011
(Continued)

OTHER PUBLICATIONS

Scheiffele, "EP 1544565, machine translation", publishd Jun. 22, 2005.*
(Continued)

*Primary Examiner* — Alex Efta
(74) *Attorney, Agent, or Firm* — Armstrong Teasdale LLP

(57) ABSTRACT

A method of forming a ceramic matrix composite component is provided. The method includes applying a first amount of adhesive across a surface of a release film, providing a first ceramic foam panel including a plurality of channels formed on a first side of the first ceramic foam panel, contacting the first ceramic foam panel and the release film such that adhesive transfers to the first side of the first ceramic foam panel, and coupling the first ceramic foam panel to a second ceramic foam panel.

19 Claims, 3 Drawing Sheets

(51) Int. Cl.

| | | |
|---|---|---|
| B44C 1/165 | (2006.01) | |
| B44C 1/17 | (2006.01) | |
| B32B 37/00 | (2006.01) | |
| C09J 5/04 | (2006.01) | |
| B32B 5/32 | (2006.01) | |
| C04B 35/488 | (2006.01) | |
| B32B 3/30 | (2006.01) | |
| B32B 7/12 | (2006.01) | |
| B32B 18/00 | (2006.01) | |
| B32B 37/12 | (2006.01) | |
| C04B 37/00 | (2006.01) | |
| F01D 11/24 | (2006.01) | |
| F23R 3/00 | (2006.01) | |
| F28F 3/12 | (2006.01) | |
| C04B 38/00 | (2006.01) | |
| F28F 21/04 | (2006.01) | |
| C04B 111/28 | (2006.01) | |

(52) U.S. Cl.
CPC ....... *B32B 2605/18* (2013.01); *C04B 2111/28* (2013.01); *C04B 2237/341* (2013.01); *C04B 2237/343* (2013.01); *C04B 2237/36* (2013.01); *C04B 2237/361* (2013.01); *C04B 2237/368* (2013.01); *C04B 2237/38* (2013.01); *C04B 2237/385* (2013.01); *C04B 2237/592* (2013.01); *C04B 2237/62* (2013.01); *C04B 2237/708* (2013.01); *C04B 2237/72* (2013.01); *C04B 2237/88* (2013.01); *F05D 2240/11* (2013.01); *F05D 2260/204* (2013.01); *F05D 2300/514* (2013.01); *F05D 2300/6033* (2013.01); *F05D 2300/612* (2013.01); *F23M 2900/05004* (2013.01); *F23R 2900/00018* (2013.01); *F28F 21/04* (2013.01); *F28F 2275/025* (2013.01); *Y02T 50/672* (2013.01); *Y02T 50/675* (2013.01); *Y10T 156/10* (2015.01); *Y10T 428/24496* (2015.01)

(56) References Cited

U.S. PATENT DOCUMENTS

| | | | | |
|---|---|---|---|---|
| 4,678,529 | A * | 7/1987 | Drake | B41J 2/1604 |
| | | | | 156/234 |
| 5,520,986 | A * | 5/1996 | Wang | B41M 1/12 |
| | | | | 118/213 |
| 7,048,986 | B2 * | 5/2006 | Shah | B32B 3/12 |
| | | | | 428/117 |
| 2002/0174936 | A1 * | 11/2002 | Burdon | B32B 18/00 |
| | | | | 156/89.11 |
| 2004/0031558 | A1 * | 2/2004 | Johnck | B29C 66/54 |
| | | | | 156/230 |
| 2004/0112504 | A1 * | 6/2004 | Roosen | B32B 18/00 |
| | | | | 156/89.16 |
| 2005/0260930 | A1 * | 11/2005 | Okuda | B24B 55/02 |
| | | | | 451/41 |
| 2008/0105402 | A1 * | 5/2008 | Behrens | B64C 1/40 |
| | | | | 165/41 |
| 2008/0196869 | A1 | 8/2008 | Behrens et al. | |

FOREIGN PATENT DOCUMENTS

| | | | | |
|---|---|---|---|---|
| DE | 202010015615 U1 * | 3/2011 | ........... | F28D 9/0012 |
| EP | 1544565 A2 * | 6/2005 | ............ | B32B 18/00 |
| EP | 2571686 | 9/2012 | | |
| JP | 2007008774 | 1/2007 | | |
| WO | 2007033378 A1 | 3/2007 | | |

OTHER PUBLICATIONS

Giden et al., "DE 102008019556, machine translation", published Oct. 22, 2009.*
Gab Neumann gmbh, "DE 202010015615, machine translation", published Apr. 7, 2011.*
PCT International Search Report and Written Opinion for related application PCT/US2014/055566 dated May 25, 2015; 13 pp.
EPO International Preliminary Report on Patentability and Written Opinion for related application PCT/US2014/055566 dated Jun. 16, 2016; 10 pp.

* cited by examiner

CERAMIC MATRIX COMPOSITE COMPONENT AND METHOD OF FORMING THEREOF

BACKGROUND

The field of the present disclosure relates generally to ceramic matrix composites and, more specifically, to methods of assembling ceramic matrix composite components.

Ceramic matrix composites (CMC) are materials formed from a continuous reinforcing phase (i.e., ceramic and/or carbon fibers) embedded in a ceramic phase (i.e., a matrix material). CMC materials generally have more desirable physical properties over other known materials typically used in military and/or industrial technical applications, for example. Exemplary physical properties include, but are not limited to, high-temperature stability, high thermal-shock resistance, high hardness, high corrosion resistance, and nonmagnetic and nonconductive properties, as well as having a lighter weight than other known materials. CMC materials are often used, for example, in industrial electric equipment, aircraft, spacecraft, automobiles, electronic devices and equipment, and in components designed for use in high-temperature applications.

At least some known CMC components used in high-temperature applications include a plurality of cooling passages formed therein. More specifically, fluid such as pressurized air is channeled through the cooling passages to facilitate cooling the component during operation. One known method of forming cooling passages in CMC components includes forming a ceramic foam core and removing material therefrom to form the cooling passages. However, orienting the cooling passages may be undesirably limited by the mechanical means used to form the cooling passages. Another known method includes forming ceramic foam core panels and then machining channels into at least one of the panels prior to the panels being coupled together with an adhesive such that the formed passages extend between the coupled panels. However, applying adhesive to the channeled side of the panel may be a time-consuming and laborious task. Moreover, the amount of adhesive applied to the panels must be controlled to prevent blockage of the cooling passages by excess adhesive.

BRIEF DESCRIPTION

In one aspect, a method of forming a ceramic matrix composite component is provided. The method includes applying a first amount of adhesive across a surface of a release film, providing a first ceramic foam panel including a plurality of channels formed on a first side of the first ceramic foam panel, contacting the first ceramic foam panel and the release film such that adhesive transfers to the first side of the first ceramic foam panel, and coupling the first ceramic foam panel to a second ceramic foam panel.

In another aspect, a ceramic matrix composite component is provided. The component includes a first ceramic foam panel including a plurality of channels formed on a first side of said first ceramic foam panel and a first amount of adhesive applied to the first side of said first ceramic foam panel. The first amount of adhesive is transferred to the first side from a surface of a release film. The component also includes a second ceramic foam panel coupled to the first ceramic foam panel with the first amount of adhesive.

DETAILED DESCRIPTION

The implementations described herein relate to methods of forming ceramic matrix composite (CMC) components. More specifically, the CMC components are formed by coupling ceramic foam panels together with an adhesive. In the exemplary implementation, the CMC components include a plurality of cooling passages defined therein. The cooling passages are formed by forming a plurality of channels in a side of at least one of the ceramic foam panels, and coupling the channeled side of the ceramic foam panel to another ceramic foam panel. In the exemplary implementation, a predetermined amount of adhesive is applied to the channeled side of the panel by applying the adhesive to a release film and pressing the panel against the release film to transfer the adhesive to the panel. As such, the amount of adhesive is controlled to facilitate limiting blockage of the cooling passages from excess adhesive during formation of the component.

Figure 1:
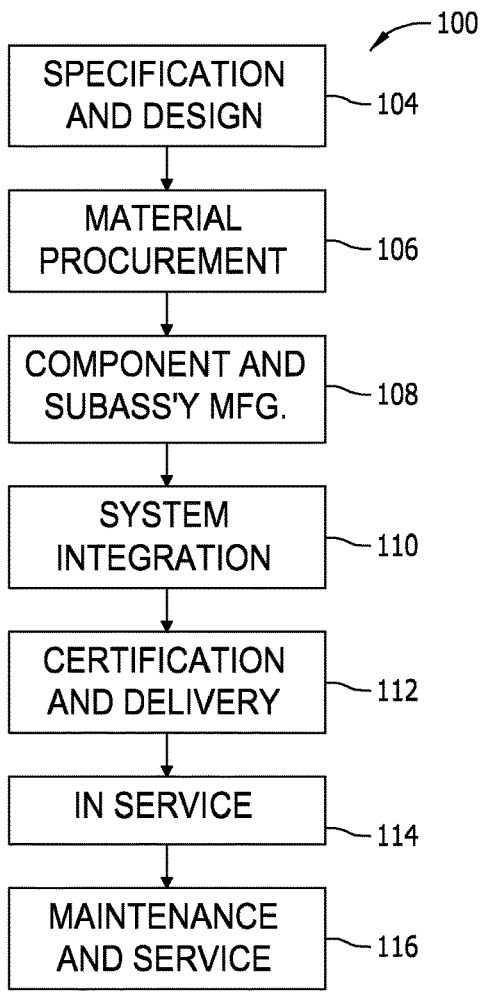
FIG. 1 is a flow diagram of an exemplary aircraft production and service methodology.
Figure 2:
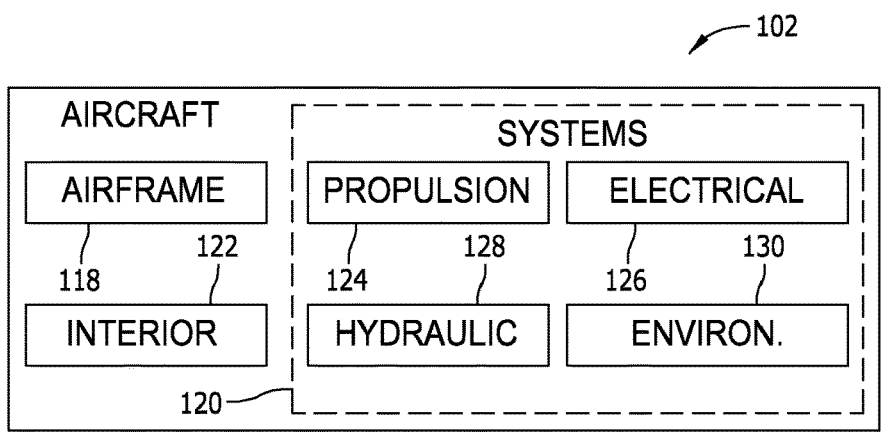
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
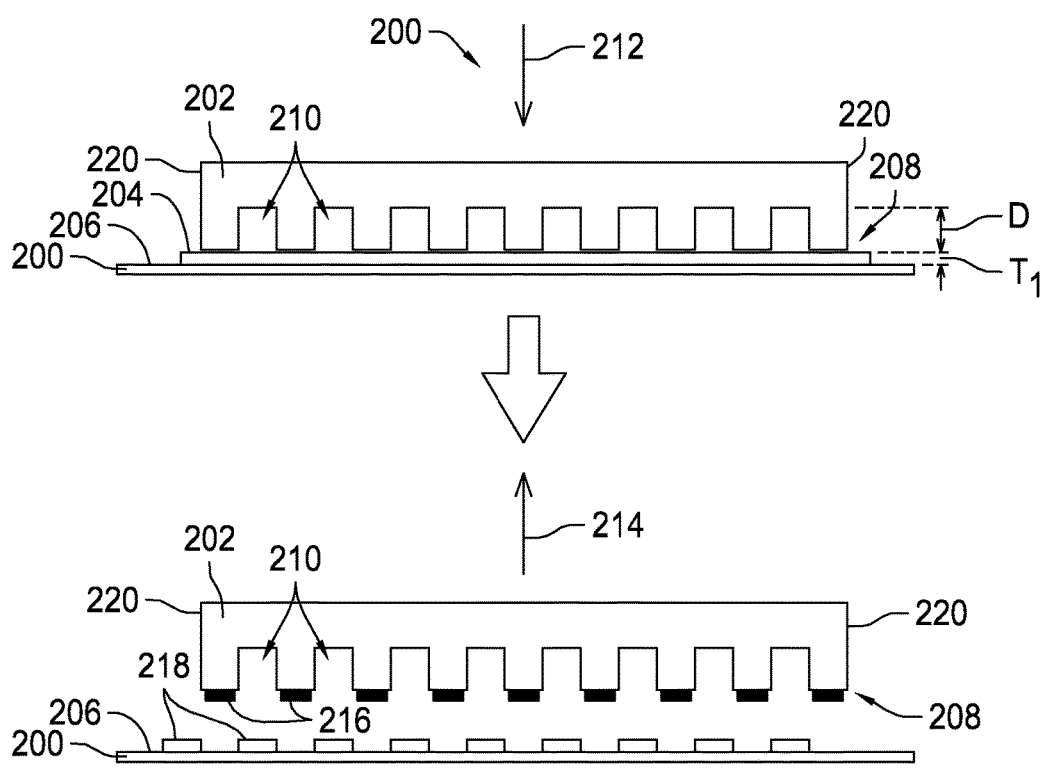
FIG. 3 is a schematic illustration of transferring adhesive to an exemplary ceramic foam panel.

FIG. 3 is a schematic illustration of transferring adhesive to an exemplary ceramic foam panel. In the exemplary implementation, a release film 200 and a first ceramic foam panel 202 are provided. A first amount 204 of adhesive is applied across a surface 206 of release film 200. The adhesive is any adhesive configured to bond ceramic foam panels. First ceramic foam panel 202 includes a first side 208 positioned adjacent to release film 200 and first amount 204 of adhesive, and include a plurality of channels 210 formed on first side 208. Channels 210 are formed on first side 208 at any depth D that enables first ceramic foam panel 202 to function as described herein. Moreover, channels 210 extend through first ceramic foam panel 202 in any orientation that enables first ceramic foam panel 202 to function as described herein.

In the exemplary implementation, a compressive force 212 is applied to first ceramic foam panel 202 to press panel 202 against release film 200 and to transfer the adhesive to first side 208 of panel 202. First amount 204 is determined to ensure an excessive amount of adhesive does not flow into channels 210 when compressive force 212 is applied. For example, first amount 204 of adhesive is determined to be a sufficient amount by measuring a thickness $T_1$ of first amount 204 on surface 206 of release film 200. First amount 204 may have any thickness $T_1$ that enables the method to function as described herein. In the exemplary implementation, first amount 204 of adhesive extends across release film 200 at a substantially uniform thickness $T_1$ within a range between about 8 mils and about 10 mils.

After pressing first ceramic foam panel 202 against first amount 204 of adhesive, panel 202 is separated from release film 200 by applying a removal force 214 to panel 202. As panel 202 is separated from release film 200, at least a portion of first amount 204 of adhesive transfers to first side 208 of panel 202. More specifically, first portions 216 of first amount 204 of adhesive are transferred to first side 208 of panel 202, and second portions 218 of first amount 204 of adhesive remain on release film 200 at locations voided by channels 210. As such, channels 210 remain substantially free of adhesive. Moreover, in the exemplary implementation, first amount 204 of adhesive extends past free edges 220 of panel 202 such that first portions 216 of adhesive are transferred to panel 202 in a single application. In an alternative implementation, any amount of adhesive may be applied to release film 200.

Release film 200 is fabricated from any material that enables the method to function as described herein. More specifically, release film 200 is fabricated from material that facilitates selectively transferring first portions 216 of adhesive to panel 202. As used herein, "selective transfer" refers to a greater amount of adhesive transferred to panel 202 than that remains on release film 200 at contact points therebetween. Release film 200 is also fabricated from a flexible material that facilitates conforming to a shape of panel 202, and that is corrosion resistant to constituents of the adhesive. Exemplary materials used to fabricate release film 200 include, but are not limited to, polyethylene terephthalate, polyvinyl chlorides, high density polyethylene, polypropylenes, and polycarbonates.

Figure 4:
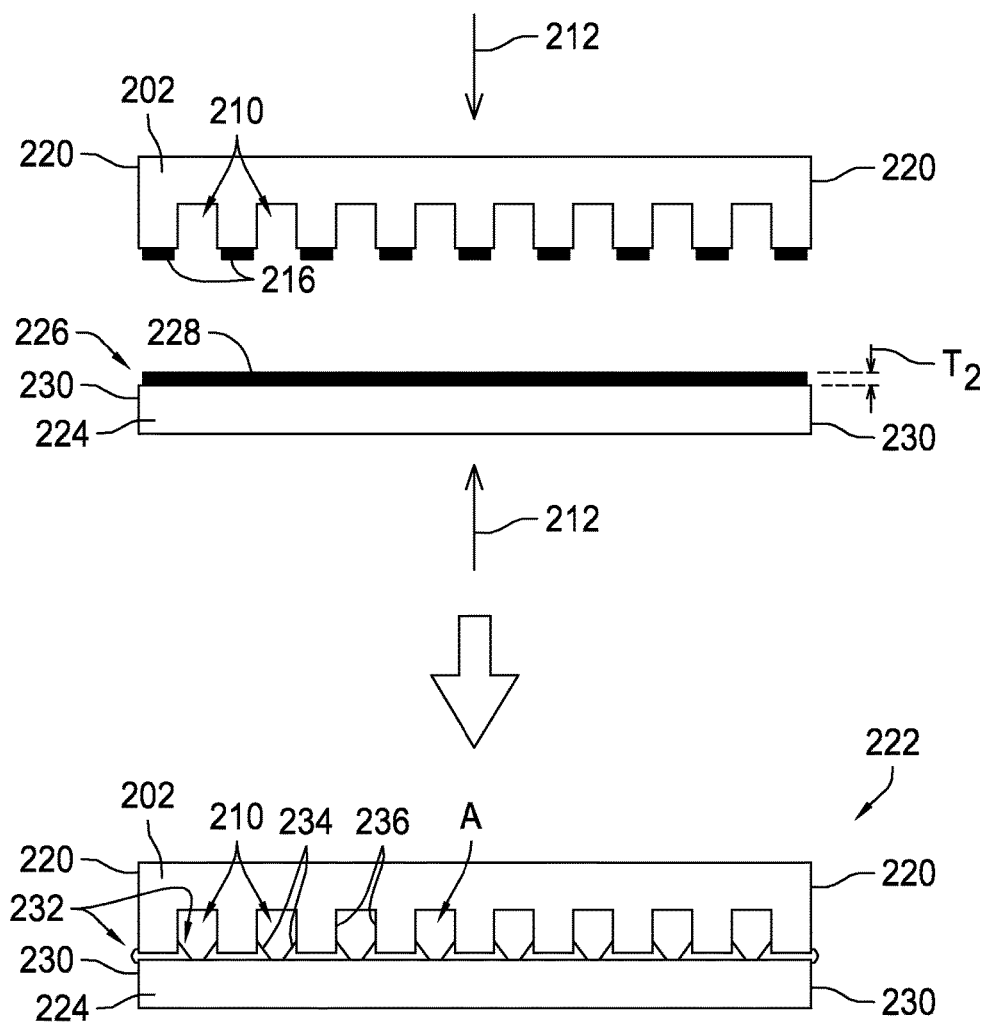
FIG. 4 is a schematic illustration of forming an exemplary matrix composite component.

FIG. 4 is a schematic illustration of forming an exemplary matrix composite (CMC) component 222. In the exemplary implementation, CMC component 222 is formed from first ceramic foam panel 202 and a second ceramic foam panel 224. First and second ceramic foam panels 202 and 224 may be formed from any material that enables CMC component 222 to function as described herein. Exemplary materials include, but are not limited to, oxide-based materials including alumina, mullite, boron nitride, boron carbide, sialons (silicon, aluminium, oxygen, and nitrogen), intermetallics, and combinations thereof. Second ceramic foam panel 224 also includes a first side 226 that has a substantially complementary shape to first side 208 of first ceramic foam panel 202. For example, first side 226 of second ceramic foam panel 224 may have a substantially flat surface and/or include channels (not shown) formed therein at locations that substantially align with channels 210 when first and second ceramic foam panels 202 and 224 are coupled together.

In the exemplary implementation, second amount 228 of adhesive is applied to first side 226 of second ceramic foam panel 224. Second amount 228 may have any thickness $T_2$ that enables the method to function as described herein. More specifically, second amount 228 may have any thickness $T_2$ such that the combined thicknesses $T_1$ and $T_2$ of first and second amounts 204 and 228 are within a range between about 16 mils and 20 mils. In the exemplary implementation, second amount 228 of adhesive extends across first side 226 of second ceramic foam panel 224 at a substantially uniform thickness $T_2$ within a range between about 8 mils and about 10 mils.

After second amount 228 of adhesive is applied to first side 226 of second ceramic foam panel 224, compressive force 212 is applied to first and second ceramic foam panels 202 and 224 to couple them together. More specifically, free edges 220 of first ceramic foam panel 202 and free edges 230 of second ceramic foam panel 224 are substantially aligned, and first sides 208 and 226 are oriented to be adjacent to each other. Compressive force 212 is then applied such that adhesive diffuses at least partially into first and second ceramic foam panels 202 and 224. Moreover, excess adhesive 232 at least partially flows into channels 210 forming fillets 234 between a side wall 236 of channels 210 and first side 226 of second ceramic foam panel 224. Such "squeeze out" of excess adhesive 232 indicates that a secure bond is formed between first and second ceramic foam panels 202 and 224. Moreover, first and second amounts 204 and 228 of adhesive are selected to ensure excess adhesive 232 only partially blocks channels 210. In the exemplary implementation, excess adhesive 232 facilitates reducing a cross-sectional area A of channels 210 by less than about 10 percent. In an alternative embodiment, any number of additional ceramic foam panels may be coupled together to form CMC component 222.

CMC component 222 is then cured and sintered to couple first and second ceramic foam panels 202 and 224 together. More specifically, in the exemplary implementation, CMC component 222 is vacuum bagged and held at a pressure within a range between about 18 inches of Mercury and about 20 inches of Mercury. CMC component 222 is then cured under vacuum in an oven (not shown) at a predetermined temperature and for a predetermined duration, and sintered in a standard atmospheric furnace (not shown) at a predetermined temperature and for a predetermined duration.

The implementations described herein facilitate limiting blockage of internal passages of a ceramic matrix composite (CMC) component during the fabrication thereof For example, CMC components are generally fabricated by bonding panels of ceramic foam together with an adhesive. The methods described herein facilitate controlling the amount of adhesive applied to each ceramic foam panel to facilitate limiting blockage of the internal passages by excess adhesive. More specifically, a predetermined amount of adhesive is applied to a release film, and a channeled side of a first ceramic foam panel is pressed against the release film to selectively transfer the adhesive thereto. As such, a predetermined amount of adhesive is easily transferred to the channeled side of the panel.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a ceramic matrix composite component, said method comprising:
    applying a first amount of adhesive across a surface of a release film;
    providing a first ceramic foam panel including a plurality of channels formed on a first side of the first ceramic foam panel;
    pressing the first side of the first ceramic foam panel against the first amount of adhesive and release film;
    separating the first ceramic foam panel from the release film such that a portion of the first amount of adhesive transfers to the first side of the first ceramic foam panel;
    aligning the first side of the first ceramic foam panel to a first side of a second ceramic foam panel;
    applying a compressive force between the first ceramic foam panel and the second ceramic foam panel such that at least a portion of the adhesive transferred to the first side of the first ceramic foam panel diffuses at least partially into the first and second ceramic foam panels; and
    curing and sintering to couple the first and second ceramic foam panels, wherein the first amount of adhesive is selected such that excess adhesive flows into the plurality of channels when the compressive force is applied, thereby forming a fillet from the excess adhesive that is oriented such that the plurality of channels remain at least partially open.

2. The method in accordance with claim 1, wherein applying the first amount of adhesive comprises determining the first amount of adhesive that facilitates limiting excess adhesive from flowing into the plurality of channels.

3. The method in accordance with claim 2, wherein determining the first amount of adhesive comprises measuring a thickness of the first amount of adhesive on the surface of the release film.

4. The method in accordance with claim 1, wherein applying the first amount of adhesive comprises forming a first layer of adhesive having a thickness within a range between about 8 mils and about 10 mils on the surface of the release film.

5. The method in accordance with claim 1, wherein applying the first amount of adhesive comprises applying the first amount of adhesive at a substantially uniform thickness across the surface of the release film.

6. The method in accordance with claim 1, wherein applying a first amount of adhesive comprises extending the first amount of adhesive over the surface of the release film such that the first amount of adhesive extends past free edges of the first ceramic foam panel.

7. The method in accordance with claim 1, further comprising:
    applying a second amount of adhesive to a the first side of the second ceramic foam panel; and
    applying a compressive force between the first ceramic foam panel and the second ceramic foam panel such that at least a portion of the adhesive transferred to the first side of the first ceramic foam panel and the second amount of adhesive diffuses at least partially into the first ceramic foam panel and the second ceramic foam panel.

8. The method in accordance with claim 7, further comprising determining the first and second amounts of adhesive that facilitate reducing a cross-sectional area of the plurality of channels by less than about 10 percent.

9. The method in accordance with claim 7, wherein applying the second amount of adhesive comprises forming a second layer of adhesive having a thickness within a range between about 8 mils and about 10 mils on the first side of the second ceramic foam panel.

10. The method in accordance with claim 1 further comprising forming the fillet between a side wall of the plurality of channels and a first side of the second ceramic foam panel.

11. The method in accordance with claim 1, wherein aligning the first side of the first ceramic foam panel to a first side of a second ceramic foam panel comprises substantially aligning free edges of the first and second ceramic foam panels.

12. The method in accordance with claim 1, wherein contacting the first ceramic foam panel and the release film comprises contacting the first ceramic foam panel and the release film such that the portion of the first amount of adhesive selectively transfers to the first side of the first ceramic foam panel.

13. The method in accordance with claim 1 further comprising forming the release film from a flexible material.

14. A ceramic matrix composite component comprising:
    a first ceramic foam panel including a plurality of channels formed on a first side of said first ceramic foam panel, wherein each channel of the plurality of channels includes at least one interior side wall;
    a first amount of adhesive applied to said first side of said first ceramic foam panel, wherein said first amount of adhesive is transferred to said first side from a surface of a release film by pressing said first side of said first ceramic foam panel against said first amount of adhesive and release film and separating said first ceramic foam panel from said release film such that a portion of said first amount of adhesive transfers to said first side of the first ceramic foam panel; and
    a second ceramic foam panel coupled to said first ceramic foam panel with said portion of said first amount of adhesive, wherein said first amount of adhesive is selected such that at least a portion of said first amount of adhesive diffuses at least partially into said first and second ceramic foam panels and such that excess adhesive flows into said plurality of channels when said first ceramic foam panel and said second ceramic foam panel are coupled together by curing and sintering, wherein a fillet is formed from said excess adhesive, said fillet oriented such that said at least one interior side wall remains exposed to fluid channeled through said plurality of channels.

15. The component in accordance with claim 14 further comprising a second amount of adhesive applied to a first side of said second ceramic foam panel to be coupled to said first ceramic foam panel.

16. The component in accordance with claim 15 further comprising determining the first and second amounts of adhesive that facilitate reducing a cross-sectional area of the plurality of channels by less than about 10 percent.

17. The component in accordance with claim 14, wherein said first amount of adhesive on the surface of the release film has a thickness within a range between about 8 mils and about 10 mils.

18. The component in accordance with claim 14, wherein the fillet is formed between a side wall of said plurality of channels and a first side of said second ceramic foam panel.

19. The component in accordance with claim 14, wherein said first amount of adhesive is determined such that the excess adhesive flowing into said plurality of channels facilitates reducing a cross-sectional area of said plurality of channels by less than about 10 percent.

* * * * *

UNITED STATES PATENT AND TRADEMARK OFFICE
CERTIFICATE OF CORRECTION

PATENT NO. : 10,071,537 B2  
APPLICATION NO. : 14/099225  
DATED : September 11, 2018  
INVENTOR(S) : Muench et al.

Page 1 of 1

It is certified that error appears in the above-identified patent and that said Letters Patent is hereby corrected as shown below:

In the Claims

In Column 6, Line 17, Claim 7, delete "a the" and insert therefor -- the --.

Signed and Sealed this  
Thirtieth Day of October, 2018

Andrei Iancu  
*Director of the United States Patent and Trademark Office*